United States Patent
Keller et al.

[11] Patent Number: 5,943,344
[45] Date of Patent: Aug. 24, 1999

[54] METHOD AND APPARATUS FOR FORMATTING SYNCHRONOUS AND ASYNCHRONOUS DATA

[75] Inventors: Ralf Keller, Würselen; Gregor Bautz; Norbert Niebert, both of Aachen; Jamshid Khun Jush, Nuremberg; Wolfgang Koch, Heroldsberg, all of Germany

[73] Assignee: Telefonaktiebolaget L M Ericsson, Sweden

[21] Appl. No.: 08/856,332

[22] Filed: May 14, 1997

[51] Int. Cl.$^6$ ................................. H04J 3/16; H04J 3/22
[52] U.S. Cl. ............................. 370/468; 370/336
[58] Field of Search ..................... 370/465, 471, 370/472, 476, 487, 490, 498, 336, 337, 345, 352, 468

[56] References Cited

U.S. PATENT DOCUMENTS 5,509,007 4/1996 Takashima et al. .................... 370/60.1

FOREIGN PATENT DOCUMENTS 0713347 5/1996 European Pat. Off. ....... H04Q 11/04

OTHER PUBLICATIONS

8089 IEEE Transactions on Communications, vol. 43, Jan. 1995; *Fixed-and Movable-Boundary Channel-Access Schemes for Integrated Voice/Data Wireless Networks*; USA; J.E. Wieselthier et al.

*Primary Examiner*—Michael Horabik
*Assistant Examiner*—Kevin C. Harper
*Attorney, Agent, or Firm*—Jenkens & Gilchrist, P.C.

[57] ABSTRACT

A method, and associated apparatus, formats asynchronous data, such as ATM data traffic, and synchronous data, such as synchronous voice traffic, pursuant to a common format. Once formatted pursuant to the common format, data generated during operation of two different types of communication systems can be communicated over a common radio link. A single frequency band can be used to communicate communication signals generated during operation of at least two separate communication systems.

15 Claims, 3 Drawing Sheets

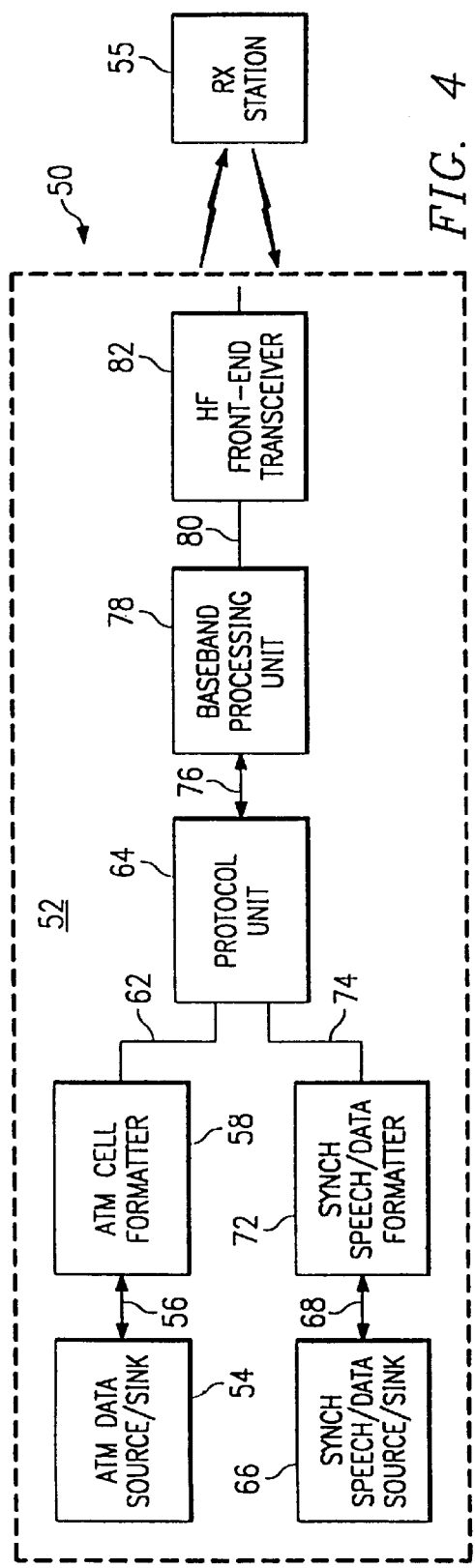
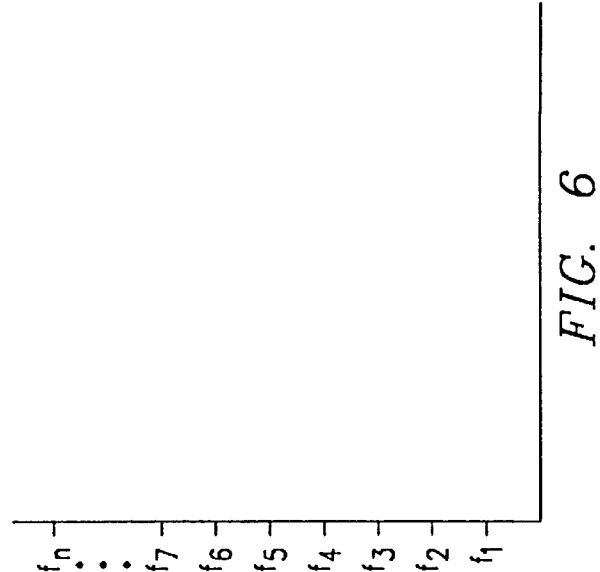
FIG. 4
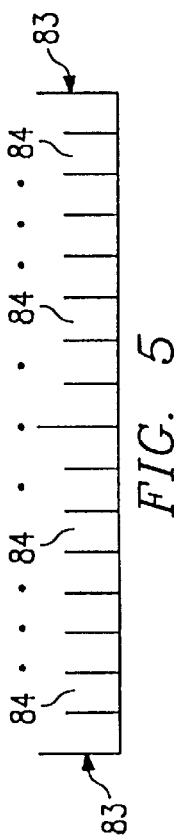
FIG. 5
FIG. 6

METHOD AND APPARATUS FOR FORMATTING SYNCHRONOUS AND ASYNCHRONOUS DATA

The present invention relates generally to communication of data over a radio air interface. More particularly, the present invention relates to a method, and an associated apparatus, for formatting asynchronous and synchronous data pursuant to a common format defining a superframe, thereby to permit selective transmission of the asynchronous and synchronous data over the radio air interface.

Once formatted, both the asynchronous and synchronous data can be transmitted upon a single radio link. Thereby, different types of radio networks are able to co-exist in a single frequency band.

The superframe is divided into separate portions. One portion defines frames dedicated to asynchronous data; another portion defines frames dedicated to synchronous data. The separate portions of the superframe dedicated to the communication of the different types of data can by dynamically made, thereby to utilize most efficiently the available bandwidth. When communication of greater levels of asynchronous data is necessitated, greater portions of the superframe are allocated to the communication of asynchronous data. Analogously, when communication of greater levels of synchronous data is necessitated, greater portions of the superframe can correspondingly be allocated for the communication of such synchronous data. A header portion of the superframe indicates at least which portions of the superframe contain asynchronous data and which portions of the superframe contain synchronous data.

BACKGROUND OF THE INVENTION

Advancements in communication technologies have permitted significant improvements in the manners by which data can be communicated between a sending and a receiving station.

For instance, in radio communications, advancements in digital communication techniques are permitted the introduction of, and popularization of, new types of communication systems. For example, cellular communication systems which utilize digital communication technologies have been installed in many areas and are widely utilized. Conventional, cellular communication systems typically transmit synchronous voice and other data.

Advancements in communication technologies have also facilitated the decentralization of computer systems. Processing devices can be distributed at separate locations and connected together by network connections. When connected together, the processing devices form LANs (local area networks). Groups of LANs can be connected together to form WANs (wide area networks).

A packet-data protocol, ATM (asynchronous transfer mode), is a standard protocol frequently utilized in data communications. In ATM communications, data to be communicated between a sending a receiving station is formatted into fixed-length cells. Groups of the cells form packets of data which are transmitted between the sending and receiving stations to effectuate communication therebetween.

The advancements in communication technologies have also permitted the merging of radio and network-connected communication systems. For instance, it is possible for a terminal device, such as a portable computer, to be coupled by way of a radio link to network infrastructure of a radio communication system and, in turn, by way of the network, or other wireline connection to a data terminal. To communicate between the terminal device and the data terminal, the terminal device can utilize the ATM protocol, and the ATM cells forming the packets of data are transmitted over the radio link between the terminal device and the data terminal.

The communication capacity of a radio communication system is sometimes limited by the frequencies allocated to form radio channels operable therein. As radio communications are increasingly utilized, both for conventional communication of synchronous data and also for the communication for ATM-type data, proposals have been set forth to allocate additional frequency bands for such communications.

For instance, proposals have been set forth to utilize frequencies available in the 5 GHz frequency band both for the communication of synchronous data and also for the communication of asynchronous, such as ATM, data. Viz., the same radio link shall be used for both the communication of asynchronous data and also the communication of synchronous data. Therefore, different types of radio networks must co-exist in one frequency band.

Synchronous communications can typically be effectuated by narrowband techniques. And, receivers operable to receive synchronous data communicated in such manners need only receive and process narrowband signals. Conversely, at least some asynchronous communications are effectuated by broadband techniques. For example, multimedia communications typically are effectuated utilizing broadband techniques.

A narrowband receiver typically requires less power and processing capacity than a broadband receiver as a broadband receiver must be constructed to receive data over a broad range of frequencies.

If both narrowband, synchronous and broadband, asynchronous communications are to be effectuated over a common frequency band, a formatting scheme which does not require receivers operable to receive only synchronous communications to receive communication signals over a broad frequency range.

That is to say, radio receivers operable in radio networks which communicate only synchronous, narrowband data need not be constructed to receive also the broadband data, such as that which might be communicated pursuant to ATM, or other asynchronous data transmissions.

It is in light of this background information related to the communication of synchronous and asynchronous data that the significant improvements of the present invention have evolved.

SUMMARY OF THE INVENTION

The present invention, accordingly, advantageously provides a method, and an associated apparatus, for formatting asynchronous and synchronous data pursuant to a common format defining a superframe. Once formatted, the asynchronous and synchronous data can be selectively transmitted over a radio air interface between sending and receiving stations.

The different types of data can be transmitted upon a single frequency band. Thereby, sending and receiving stations of different radio networks are separably operable to send and to receive, respectively, communication signals communicated upon radio channels defined within a single frequency band.

In one implementation of the present invention, the superframe is divided into three portions. One portion defines frames allocated for the communication of asynchronous data. A second portion defines frames allocated for the communication of synchronous data. And, a third portion forms a control information portion forming a header.

In one implementation, the lengths of the first and second portions allocated for the communication of asynchronous and synchronous, respectively, data can be dynamically allocated, depending upon traffic conditions. When increased levels of asynchronous data is to be transmitted, a greater proportion of the superframe is allocated for the communication of asynchronous data. And, when increased levels of synchronous data is to be communicated, a greater proportion of the frames of the superframe are allocated for the communication of the synchronous data. As traffic conditions change, reallocation of the frame allocations of the superframe are made.

Because of the formatting of the superframe, a frequency band can be allocated for the communication of more than one type of data.

The superframe structure can be utilized in any of various communication systems utilizing different types of modulation schemes. For instance, in one embodiment, the superframe structure is utilized in a TDMA (time-division multiple access) communication scheme in which a carrier is divided into time slots. The frames of the superframe allocated to the communication of asynchronous data are transmitted during a first set of selected time slots. And, frames of synchronous data are transmitted during a second set of time slots. An initial time slot is selected for the communication of the header information, thereby to inform a receiving station of the time slots during which frames of data to be transmitted thereto shall be transmitted.

In another embodiment, the superframe structure is utilized in a FDMA (frequency-division multiple access) communication scheme. In an FDMA scheme, the header information is transmitted upon a first selected subcarrier, and other subcarriers are utilized for the communication of synchronous data and asynchronous data. The header information includes indications of the subcarriers upon which the asynchronous data and synchronous data are communicated.

In another embodiment, the superframe structure is utilized in a CDMA (code-division multiple access) communication scheme. The header information is coded pursuant to a first key code. Asynchronous data is coded pursuant to at least a second key code, and synchronous data is coded pursuant to at least a third key code. The header information includes information of the key codes pursuant to which the data transmitted to selected receivers is coded. Thereby, the receivers are able to decode the data transmitted thereto.

In these and other aspects, therefore, a method, and associated apparatus, structures asynchronous data and synchronous data in a radio communication system. The data is structured pursuant to a common data format forming a superframe. The asynchronous data and the synchronous data are selectively transmittable between at least one sending station and at least one receiving station, once formatted into the superframe, upon an air interface defined within a selected electromagnetic spectrum portion. An asynchronous data portion of the superframe is designated. The asynchronous data portion is of an asynchronous data length responsive to levels of asynchronous data to be transmitted between the at least one sending station and the at least one receiving station. A synchronous data portion of the superframe is designated. The synchronous data portion is of a synchronous data length responsive to levels of synchronous data to be transmitted between the at least one sending station and the at least one receiving station. A control information portion of the superframe is also designated. The control information portion indicates values of the asynchronous data length and values of the synchronous data length.

A more complete appreciation of the present invention and the scope thereof can be obtained from the accompanying drawings which are briefly summarized below, the following details of the description of the presently-preferred embodiments of the invention, and the appended claims.

BRIEF DESCRIPTION OF THE DRAWINGS

FIG. 4 illustrates a functional block diagram of a communication system operable to transceive communication signals formatted into the superframe structure shown in FIG. 1.

FIG. 5 illustrates the time slots of a TDMA (time-division, multiple access) communication scheme pursuant to which communication signal bursts are formatted according to the superframe structure shown in FIG. 1 are transmitted in an embodiment of the present invention.

FIG. 6 illustrates the frequency channels defined in an FDMA (frequency-division, multiple access) communication scheme pursuant to which communication signals formatted according to the superframe shown in FIG. 1 are transmitted in another embodiment of the present invention.

DETAILED DESCRIPTION

Figure 1:
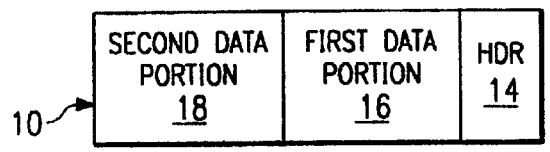
FIG. 1 illustrates a superframe constructed pursuant to an embodiment of the present invention which permits communications by more than one communication system over a single radio link.

Turning first to FIG. 1, a superframe, shown generally at 10, is illustrated. The superframe 10 provides a common data format which permits communication of communication signals generated by different types of communication systems over a common radio link. By communicating communication signals generated during operation of the separate communication systems over the common radio link, the limited spectrum available for communications can be efficiently utilized.

The superframe 10 of the exemplary embodiment illustrated in the Figure includes three separate portions, a header portion 14, a first data portion 16, and a second data portion 18. The exemplary superframe structure 10 shown in FIG. 1 permits, for instance, communication of synchronous narrowband speech and data traffic and also communication of ATM (asynchronous transfer mode) cells over a common radio link, thereby to permit communication of both types of data over the common radio link. In other embodiments, additional data portions are defined in the superframe to permit additional communication systems to be operable over the common communication link.

In the exemplary embodiment, the first and second data portions 16 and 18 are each of variable frame (or other segment) lengths. The lengths of the respective data portions 16 and 18 are freely selectable responsive to levels of communication required to be communicated during a particular time period by a particular one of the communication systems. Greater, or fewer, frames (or other segments) are allocated to the first or second data portion, as appropriate. When increased levels of communication are to be effectuated in one of the communication systems, the length of the frame portion associated with that communication system is increased to accommodate, thereby, the increased levels of communication.

The header portion 14 of the superframe 10 includes control information indicating which frames of the data portions 16 and 18 are being transmitted to particular receiving stations of the communication systems. For instance, the first data portion includes a plurality of frames, various of such frames including bursts of communication signals to be communicated to different receiving stations. The header portion 14 of the superframe 10 includes information indicating to the various receiving stations which frames of the first data portion 16 are intended for the various receiving stations.

The header portion 14 of the superframe 10 similarly includes control information related to the frames of the second data portion 18.

Because the header portion 14 of the superframe 10 includes control information indicating the location of the communication bursts intended for a particular receiving station, a receiver operable in a narrowband, speech and data communication system need not be constructed also to receive signal bursts communicated during operation of a wireless broadband, ATM communication system sharing the same radio link. The control information contained in the header portion 14 of the superframe 10 provides the narrowband receiver information required to permit the receiver to tune to the appropriate narrowband channel to receive the communication bursts intended therefor. Thereby, receiving stations intended to be operable only in the narrowband communication system need be constructed merely to receive and process a narrowband signal. A requirement otherwise to receive and to process an entire broadband signal is thereby obviated. Circuitry of such receiving stations, for instance, need only include conventional voice coders (i.e., vocoders) used for the reception of narrowband speech and data; special voice coders to permit the reception of ATM data are not needed in such receiving stations.

In an embodiment in which the first data portion 16 forms an ATM traffic area and the second data portion 18 forms a synchronous speech and data traffic area, the speech traffic area is formed of n speech and data traffic segments wherein n is of a value greater or equal to zero. Each of the segments are capable of carrying m speech channels wherein m is greater or equal to 1. The value of n of speech traffic segments is specified in the header portion 14 of the superframe 10. And, traffic reservation occurs in the respective portions 16 and 18 of the superframe. By adaptively selecting the number of segments allocated to each of the portions 16 and 18, the superframe 10 is adaptively structured to facilitate efficient usage of the radio link upon which the superframe is defined. For instance, if only ATM communications are effectuated during a selected time period, n=0. Conversely, if ATM service is limited, while a large number of speech-service users are to communicate over the radio link, the value of n is large.

Figure 2:
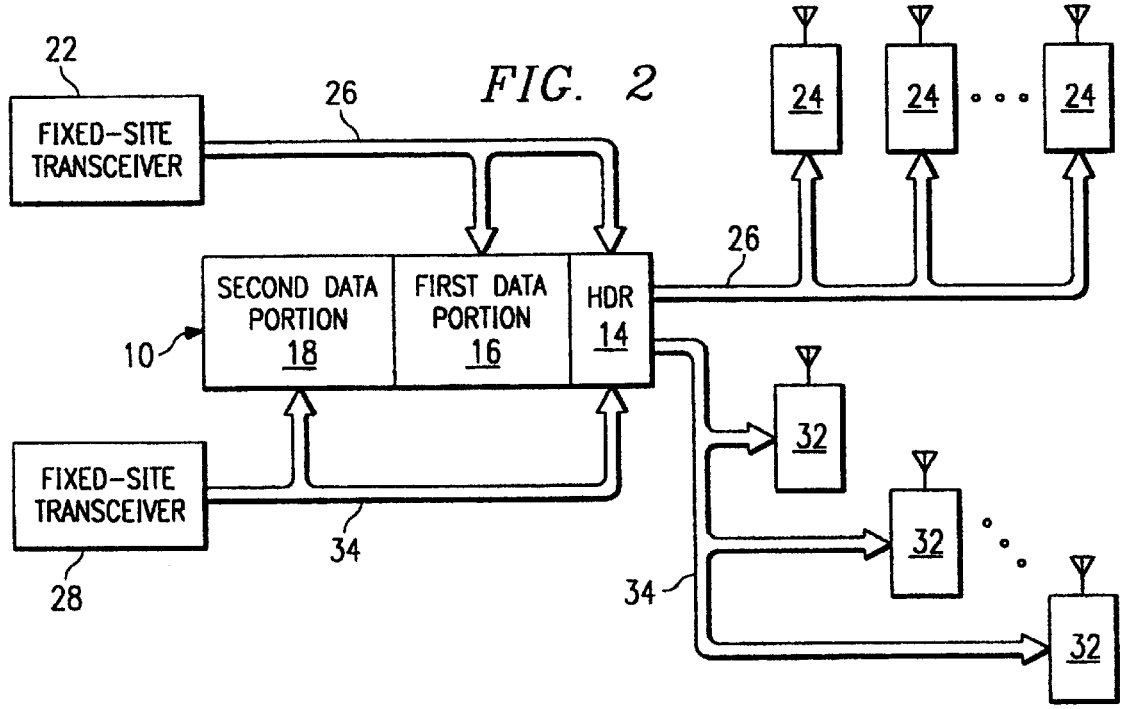
FIG. 2 illustrates a functional block diagram showing a manner by which two communication systems communicate downlink signals over a common radio link utilizing the superframe shown in FIG. 1.

FIG. 2 illustrates the superframe 10, again shown to include a header portion 14, a first data portion 16, and a second data portion 18. Again, the header portion 14 includes control information while the data portions 16 and 18 are divided into segments, here frames of data. In the exemplary embodiment, the first data portion 16 is allocated for ATM traffic, and the second data portion 18 is allocated for synchronous speech and data traffic.

A fixed-site transceiver 22 forms a sending station operable to send bursts of ATM traffic, formatted into the ATM traffic portion 16 of the superframe 10. Various ones of the frames of the portion 16 are allocated for communications with separate ones of mobile terminals 24. The header portion 14 of the superframe 10 includes control information indicating to the mobile terminals 24 which frames of the ATM traffic portion 16 are to be processed at the respective ones of the mobile terminals. The arrows 26 are representative of the formatting of the ATM traffic portion 16 of the superframe 10 with the frames of ATM traffic and the reception, and processing, of frames of the ATM traffic portion 16.

FIG. 2 further illustrates a fixed-site transceiver 28 operable in a synchronous, narrowband speech and data communication system. The transceiver 28 here forms a sending station operable to communicate bursts of synchronous data to selected ones of a plurality of mobile terminals, here mobile terminals 32, pursuant to the superframe 10 format. The arrows 34 shown in the Figure are representative of communication of the frames of synchronous data communicated pursuant to the format of the superframe 10 to individual ones of the mobile terminals 32. Control information contained in the header portion 14 of the superframe 10 provide indications to the mobile terminals 32 as to where to locate the frames of synchronous data transmitted thereto. Such portions of the superframe 10 are processed by the respective ones of the mobile terminals 32.

FIG. 3 again illustrates the superframe 10, again shown to be formed of a header portion 14, and first and second data portions 16 and 18. The first data portion 16 is again allocated for ATM traffic, and the data portion 18 is allocated for narrowband, synchronous speech and data traffic. And, a fixed-site transceiver 22 and mobile terminals 24 of an ATM communication system are again shown in the Figure. Also, a fixed-site transceiver 28 and mobile terminals 32 of a synchronous speech and data communication system are also shown in the Figure.

Here, the fixed-site transceivers 22 and 28 form receiving stations for receiving uplink transmissions generated by the mobile terminals 24 and 32, respectively. The arrows 36 are representative of the transmission of uplink bursts communicated by individual ones of the mobile terminals 24 to the fixed-site transceiver 22. Analogous to the downlink transmissions shown in FIG. 3, the header portion 14 includes control information indicating to the receiving station formed of the transceiver 22 to the location of the uplink transmissions communicated by the various ones of the mobile terminals 24. The arrows 38 shown in the Figure are representative of the uplink transmissions by individual ones of the mobile terminals 32 of the synchronous speech and data communication system. Again, control information contained in the header portion 14 indicates to the fixed-site transceiver 28 the location of the frames of data forming the uplink transmissions of the respective ones of the mobile terminals 32.

Figure 4 illustrates a communication system, shown generally at 10, having a sending station 52 and a receiving station 54 connected together by way of a radio link. Data to be communicated between the sending station 52 and the receiving station 54 is formatted pursuant to the superframe 10 shown in FIG. 1. Both asynchronous data traffic, such as ATM data traffic, and synchronous voice and data traffic can be communicated over the same radio link to one or more receiving stations 54. Here, the sending station 52 is operable to transmit both ATM data traffic and synchronous speech and data traffic.

The sending station 52 includes an ATM data source 54 forming a source of ATM data to be communicated to the receiving station 54. ATM data generated by the ATM data source 54 is provided by way of the line 56 to an ATM cell formatter 58 which formats the ATM data into ATM cells, a conventional manner by which ATM data is formatted. The ATM cells are provided by way of the line 62 to a protocol unit 64.

The sending station 52 further includes a synchronous speech and data source 66. Synchronous speech and data generated by the source 66 are provided by way of the line 68 to a synchronous speech and data formatter 72 which formats the synchronous speech and data into synchronous speech/data frames on the line 74. The line 74 is coupled to the protocol unit 64, thereby to provide the frames formed by the formatter 72 to the protocol unit 64.

The data sources 54 and 66 and formatters 58 and 72, in one embodiment, are functionally formed at a personal computer or work station. And, the protocol unit 64 is functionally formed at a radio base station with the lines 62 and 74 extending to the base station.

In another embodiment, the protocol unit 64 is functionally formed at a mobile terminal. The data sources 54 and 66 and formatters 58 and 72, again functionally formed at a personal computer or a work station, are coupled to the mobile terminal by way of the lines 62 and 74, forming either a wireline connection or some type of RF (radio frequency), such as an infrared, connection.

The protocol unit 64 performs functions such as MAC, LLC, and handovers. Interleaving of the frames and cells applied to the protocol unit 64 by way of the lines 62 and 74, provides for the formation of superframes of data such as the superframe 10 shown previously in FIG. 1. The control information forming the header portion of the superframe is also provided at the protocol unit 64.

The protocol unit 64 is coupled by way of the line 76 to a baseband processing unit 78. Baseband processing is performed by the baseband processing unit 78. The baseband processing unit 78 is coupled by way of the line 80 to a HF (high frequency) transceiver circuit 82. The front-end transceiver 82 is operable to convert the data, formatted into the superframes, into radio frequency signals transmittable over the radio link extending between the sending station 52 and the receiving station 54.

The structure of the receiving station 54 includes elements analogous to, and generally the reverse of, the elements shown to form the sending station 52. That is to say, for instance, the front-end transceiver, when forming a portion of the receiving station, down converts radio frequency signals into baseband signals which can be processed by a baseband processing unit. The protocol unit extracts the ATM cells and speech data frames, as appropriate, from the received superframes, and the data sources 54 and 66, conversely, form data sinks.

In one embodiment, the communication system 50 is operable pursuant to a TDMA (time-division, multiple access) communication scheme. FIG. 5 illustrates an exemplary frames 83 formed pursuant to a TDMA communication scheme. Each frame is formed of a plurality of time slots 84. The exemplary frames shown in the Figure are formed of eight time slots, each of which contains a communication burst of data to be communicated to a particular receiving station. Header information is contained in at least one time slot, here the leading time slot.

In another embodiment, the communication system is operable pursuant to an FDMA (frequency-division, multiple access) communication scheme. FIG. 6 illustrates a plurality of carriers, here carrier $f_1$–$f_n$. Header information is transmitted upon one of the carriers. Other data is communicated upon other selected carriers. A narrowband receiver extracts information from the header information transmitted upon one of the selected carriers. Such information provides the receiving station with indications of to which channel to tune to receive bursts of communication signals transmitted thereto.

Figure 7:
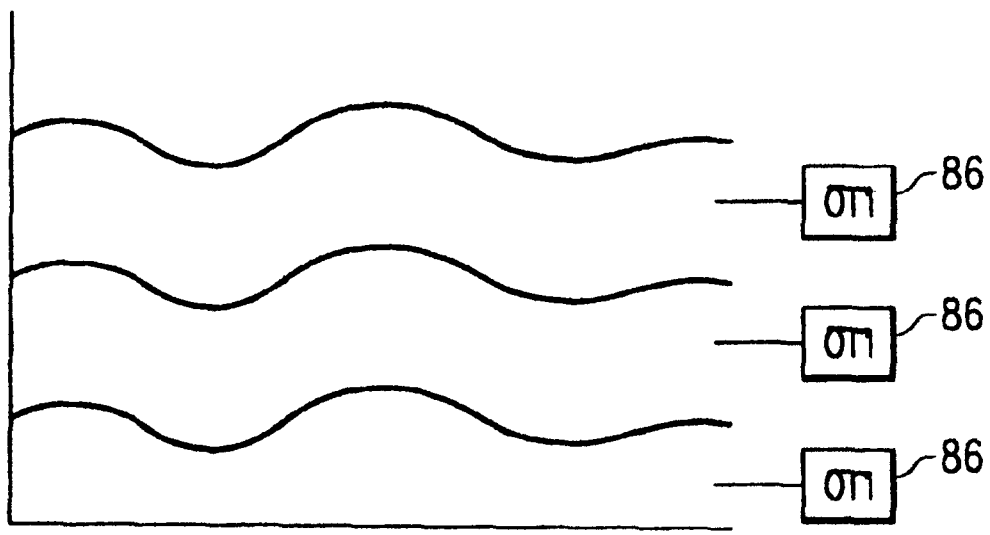
FIG. 7 illustrates a CDMA (code-division, multiple access) communication scheme pursuant to which communication signals formatted according to the superframe shown in FIG. 1 are transmitted in another embodiment of the present invention.

In another embodiment of the present invention, the communication system 50 is operable pursuant to a CDMA (code-division, multiple access) communication scheme. FIG. 7 illustrates various signals communicated over the same range of frequencies. Here, keys, indicated by the blocks 86, are used at a receiving station to decode coded information transmitted thereto. Information decoded pursuant to decoding by a first key provides information to the receiving station to permit the receiving station to decode a communication burst intended for the receiving station.

Figure 8:
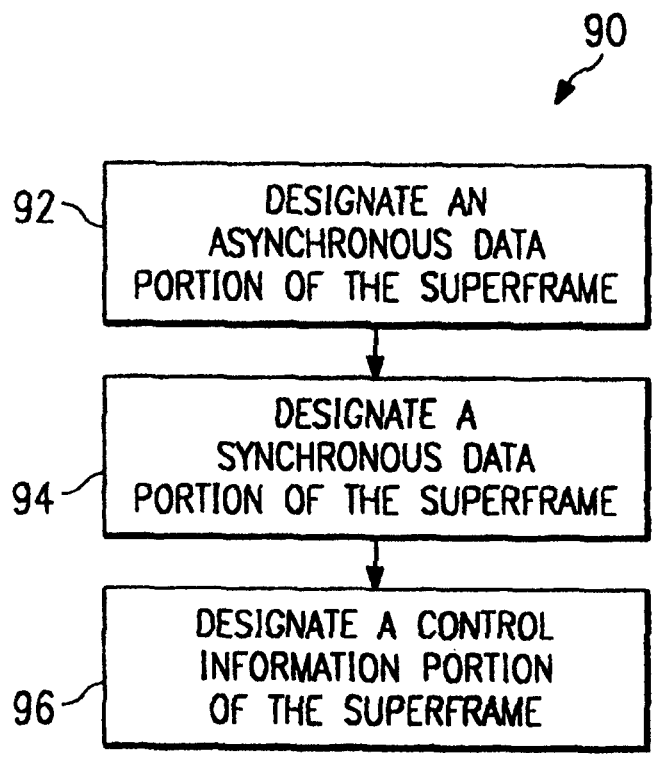
FIG. 8 illustrates a method flow diagram listing the method steps of the method of an embodiment of the present invention.

FIG. 8 illustrates a method, shown generally at 90, of an embodiment of the present invention. The method structures asynchronous data and synchronous data in a radio communication system pursuant to a common data format forming a superframe. First, and as indicated by the block 92, an asynchronous data portion of the superframe is designated. The asynchronous data portion is of a data length responsive to levels of asynchronous data to be transmitted between at least one sending station and at least one receiving station.

A synchronous data portion of the superframe is also designated, as indicated by the block 94. The synchronous data portion is of a data length responsive to levels of synchronous data to be transmitted between the at least one sending station and the at least one receiving station.

And, as indicated by the block 96, a control information portion of the superframe is designated. The control information portion indicates values of the asynchronous data length and values of the synchronous data length.

Operation of an embodiment of the present invention thereby advantageously permits both asynchronous and synchronous data to be transmitted upon a single radio link. Different types of radio networks are thereby able to co-exist in a single frequency band. The separate portions of the superframe dedicated to the communication of the different types of data can by dynamically made, thereby to utilize most efficiently the available bandwidth. Allocation and reallocation of the lengths of the separate data-containing portions of the superframe are made, as traffic conditions change, so that the possible levels of communications are permitted over the single frequency band.

The previous descriptions are of preferred examples for implementing the invention, and the scope of the invention should not necessarily be limited by this description. The scope of the present invention is defined by the following claims.

What is claimed is:

1. A method for structuring asynchronous data and synchronous data in a radio communication system pursuant to a common data format forming a superframe, the asynchronous data and the synchronous data selectively transmittable between at least one sending station and at least one receiving station, once formatted into the superframe, upon an air interface defined within a selected electromagnetic spectrum portion, said method comprising the steps of:

designating an asynchronous data portion of the superframe, the asynchronous data portion of an asynchronous data length responsive to levels of asynchronous data to be transmitted between the at least one sending station and the at least one receiving station;

designating a synchronous data portion of the superframe, the synchronous data portion of a synchronous data length responsive to levels of synchronous data to be transmitted between the at least one sending station and the at least one receiving station; and designating a control information portion of the superframe, the control information portion indicating values of the asynchronous data length and values of the synchronous data length.

2. The method of claim 1 wherein the control information portion forms a header portion positioned at a front-end portion of the superframe.

3. The method of claim 2 wherein the asynchronous data portion designated during said step of designating the asynchronous data portion is positioned to follow the header portion when the asynchronous data length is of a length of at least one asynchronous data frame.

4. The method of claim 3 wherein the synchronous data portion designated during said step of designating the synchronous data portion is positioned to follow the asynchronous portion when the synchronous data length is of a length of at least one synchronous data frame.

5. The method of claim 2 wherein the synchronous data portion designated during said step of designating the synchronous data portion is positioned to follow the header portion when the synchronous data length is of a length of at least one synchronous data frame.

6. The method of claim 1 wherein the at least one sending station comprises a first plurality of sending stations, each capable of transmitting asynchronous data, wherein the asynchronous data portion designated during said step of designating the asynchronous data portions comprises frames and wherein said step of designating the asynchronous data portion comprises allocating each sending station of the first plurality of sending stations which is to transmit asynchronous data at least one frame of the asynchronous data portion.

7. The method of claim 6 wherein the at least one receiving station comprises a first plurality of receiving stations, each capable of receiving asynchronous data, and wherein the control information portion designated during said step of designating the control information portion further indicates which frame of the at least one frame of the asynchronous data portion is transmitted by individual ones of the first plurality of sending stations to individual ones of the first plurality of receiving stations.

8. The method of claim 1 wherein the at least one sending station comprises a first plurality of sending stations, each capable of transmitting synchronous data, wherein the synchronous data portion designated during said step of designating the synchronous data portions comprises frames and wherein said step of designating the synchronous data portion comprises allocating each sending station of the first plurality which is to transmit synchronous data at least one frame of the synchronous data portion.

9. The method of claim 8 wherein the at least one receiving station comprises a first plurality of receiving stations, each capable of receiving synchronous data, and wherein the control information portion designated during said step of designating the control information portion further indicates which frame of the at least one frame of the synchronous data portion is transmitted by individual ones of the first plurality of sending stations to individual ones of the first plurality of receiving stations.

10. The method of claim 1 wherein the at least one sending station comprises at least one multi-data sending station capable of selectively transmitting both asynchronous data and synchronous data, wherein the synchronous data portion comprises frames, wherein the asynchronous data portion comprises frames, and wherein said step of designating the asynchronous data portion comprises allocating to the at least one multi-data sending station at least one frame of the asynchronous data portion.

11. The method of claim 10 wherein said step of designating the synchronous data portion comprises allocating to the at least one multi-data sending station at least one frame of the synchronous data portion.

12. The method of claim 11 wherein the at least one receiving station comprises at least one multi-data receiving station capable of selectively receiving both asynchronous data and synchronous data, and wherein the control information portion designated during said step of designating the control information portion further indicates which frame of the asynchronous data portion and which frame of the at least one frame of the synchronous data portion is to be received by the at least one multi-data receiving station.

13. The method of claim 1 wherein the radio communication system comprises a TDMA (time-division, multiple access) communication system defining at least one carrier, the at least one carrier divided into a plurality of time slots and wherein the control information portion further indicates during which time slots of the plurality of time slots that asynchronous data is to be transmitted and during which time slots of the plurality of time slots that synchronous data is to be transmitted.

14. The method of claim 1 wherein the radio communication system comprises an FDMA (frequency-division, multiple access) communication system defining a plurality of subcarriers and wherein the control information portion further indicates which subcarriers of the plurality of subcarriers upon which the asynchronous data is to be transmitted and upon which subcarriers of the plurality of subcarriers upon which the synchronous data is to be transmitted.

15. In a radio communication system having at least one sending station and at least one receiving station, an improvement of apparatus for structuring asynchronous data and synchronous data pursuant to a common data format forming a superframe, the asynchronous data selectively transmittable, once formatted into the superframe, upon an air interface defined within a selected electromagnetic spectrum portion, said apparatus comprising:

an asynchronous data portion designator coupled to receive indications of levels of asynchronous data to be transmitted between the at least one sending station and the at least one receiving station, said asynchronous data portion designator for designating a first portion of the superframe to be of a first selected length, the first selected length responsive to the indications of the levels of the asynchronous data;

a synchronous data portion coupled to receive indications of levels of synchronous data to be transmitted between the at least one sending station and the at least one receiving station, said synchronous data portion designator for designating a second portion of the superframe to be of a second selected length, the second selected length responsive to indications of the levels of the synchronous data; and a control information designator coupled to receive indications of the first selected length designated by said asynchronous data portion designator and indications of the second selected length designated by said synchronous data portion designator, said control information designator for designating a control information portion of the superframe, the control information portion of the values responsive to the indications of the first and second selected lengths, respectively.

\* \* \* \* \*

UNITED STATES PATENT AND TRADEMARK OFFICE
CERTIFICATE OF CORRECTION

Page 1 of 2

PATENT NO. : 5,943,344
DATED : Aug. 24, 1999
INVENTOR(S) : Keller et al.

Figure 3:
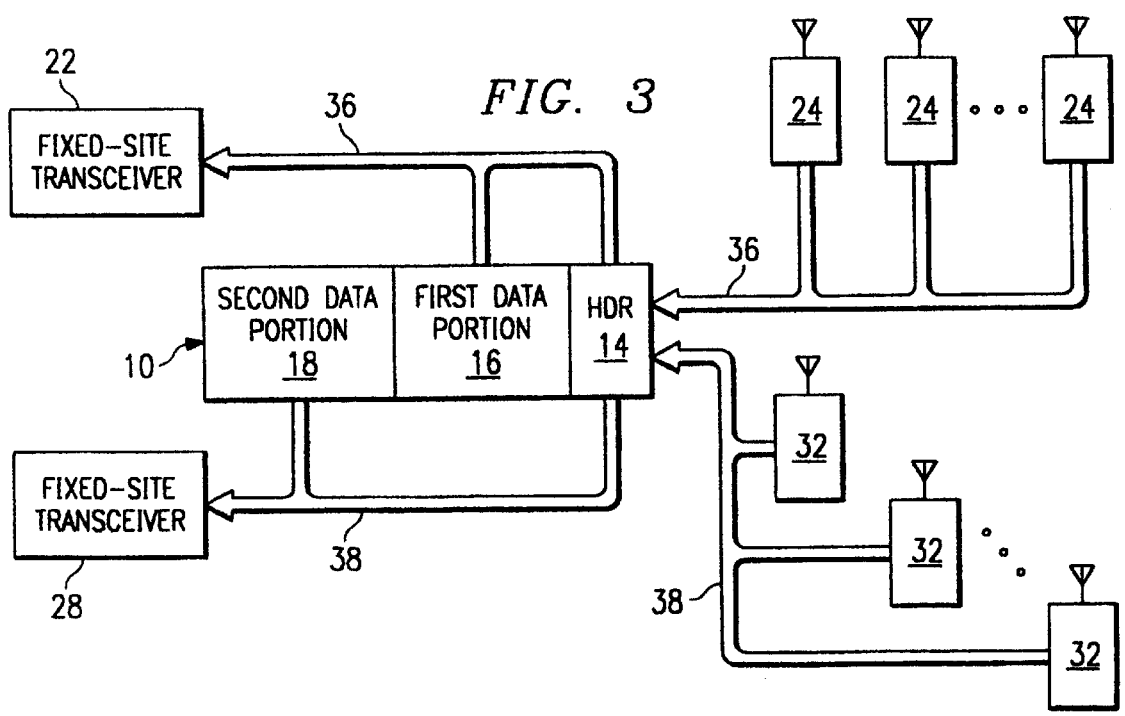
FIG. 3 illustrates a functional block diagram, similar to that shown in FIG. 2, but of uplink signals communicated over the common radio link utilizing the superframe structure shown in FIG. 1.

It is certified that error appears in the above-identified patent and that said Letters Patent is hereby corrected as shown below:

| | |
|---|---|
| Column 6, line 60 | Replace "FIG. 3" With --Figure 2-- |
| Column 7, line 6 | Replace "10" With --50-- |
| Column 7, line 7 | Replace "54" With --55-- |
| Column 7, line 9 | Replace "54" With --55-- |
| Column 7, line 13 | Replace "54" With --55-- |
| Column 7, line 60 | Replace "54" With --55-- |

UNITED STATES PATENT AND TRADEMARK OFFICE
CERTIFICATE OF CORRECTION

PATENT NO. : 5,943,344
DATED : Aug. 24, 1999
INVENTOR(S) : Keller et al.

It is certified that error appears in the above-identified patent and that said Letters Patent is hereby corrected as shown below:

Column 7, line 61        Replace "54"
                                        With --55--

Signed and Sealed this

Twenty-second Day of February, 2000

Attest:

Q. TODD DICKINSON

Attesting Officer        Commissioner of Patents and Trademarks